United States Patent
Padmanaban et al.

(12) 
(10) Patent No.: US 11,015,022 B2
(45) Date of Patent: May 25, 2021

(54) PHOSPHORUS BASED CO-MONOMER FOR POLYAMIDES

(71) Applicant: Performance Polyamides, SAS, Paris (FR)

(72) Inventors: Gururajan Padmanaban, Vadodara (IN); Kaustav Chakraborty, Vadodara (IN); Mayuri Shaiwale, Vadodara (IN); Imani B. Jones, Alpharetta, GA (US); Keshav S. Gautam, Duluth, GA (US)

(73) Assignee: Performance Polyamides, SAS, Paris (FR)

( * ) Notice: Subject to any disclaimer, the term of this patent is extended or adjusted under 35 U.S.C. 154(b) by 21 days.

(21) Appl. No.: 16/342,135

(22) PCT Filed: Oct. 13, 2017

(86) PCT No.: PCT/US2017/056549
§ 371 (c)(1),
(2) Date: Apr. 15, 2019

(87) PCT Pub. No.: WO2018/071790
PCT Pub. Date: Apr. 19, 2018

(65) Prior Publication Data
US 2019/0256656 A1    Aug. 22, 2019

(30) Foreign Application Priority Data
Oct. 14, 2016 (IN) .............................. 201621035136

(51) Int. Cl.
| | | |
|---|---|---|
| C08G 73/10 | (2006.01) | |
| C08G 69/42 | (2006.01) | |
| C08G 69/26 | (2006.01) | |
| C08G 79/04 | (2006.01) | |
| C08L 77/02 | (2006.01) | |
| C08L 77/06 | (2006.01) | |
| C08K 3/013 | (2018.01) | |
| C08J 5/04 | (2006.01) | |

(52) U.S. Cl.
CPC ........... *C08G 69/42* (2013.01); *C08G 69/265* (2013.01); *C08G 79/04* (2013.01); *C08L 77/02* (2013.01); *C08L 77/06* (2013.01); *C08J 5/042* (2013.01); *C08J 5/043* (2013.01); *C08K 3/013* (2018.01)

(58) Field of Classification Search
CPC ......... C08L 77/06; C08G 79/04; C08G 73/10; C08K 5/49
See application file for complete search history.

(56) References Cited

U.S. PATENT DOCUMENTS

| | | | |
|---|---|---|---|
| 2,646,420 A | 7/1953 | Morgan et al. | |
| 3,585,170 A * | 6/1971 | Burrows | ................. C08L 77/00 528/336 |
| 3,960,686 A | 6/1976 | Magosch et al. | |
| 4,032,517 A | 6/1977 | Pickett, Jr. et al. | |
| 5,750,603 A * | 5/1998 | Asrar | ....................... D01F 6/80 524/139 |
| 6,211,402 B1 | 4/2001 | Kleiner | |
| 6,255,371 B1 | 7/2001 | Schlosser et al. | |
| 6,344,158 B1 | 2/2002 | Schlosser et al. | |
| 6,365,071 B1 | 4/2002 | Jenewein et al. | |
| 2014/0121323 A1 | 5/2014 | Liu et al. | |

FOREIGN PATENT DOCUMENTS

| | | |
|---|---|---|
| CN | 103122501 A | 5/2013 |
| CN | 103387733 A | 11/2013 |
| DE | 102014109993 A1 | 1/2015 |
| EP | 3022274 A1 | 5/2016 |
| GB | 1048097 A | 11/1966 |

OTHER PUBLICATIONS

USPTO structure search, Dec. 2020.*
International Search Report issued in International Application No. PCT/US2017/056549, dated Jan. 8, 2018 (3 pages).
Written Opinion issued in International Application No. PCT/US2017/056549; dated Jan. 8, 2018 (4 pages).
R. Jeng et al. "Flame retardant epoxy polymers based on all phosphorus-containing components" European Polymer Journal, Feb. 12, 2002, vol. 38, scheme 2, pp. 683-693 (11 pages).
Extended European Search Report issued in European Application No. 178610143.3, dated Apr. 7, 2020 (8 pages).
C. Ik Lee et al., "Studies on the Preparation of New Flame-retardant Polyester materials Using Bromine and Phosphorous Containing Monomers", Journal of Korean Fiber Society, vol. 36, No. 5, 1999, pp. 345-353 (9 pages) with Abstract English translation.
Office Action issued in corresponding Chinese Application No. 201780063295.9; dated Dec. 23, 2020 (21 pages).

* cited by examiner

*Primary Examiner* — Gregory Listvoyb
(74) *Attorney, Agent, or Firm* — Osha Bergman Watanabe & Burton LLP

(57) ABSTRACT

The present disclosure relates to a polyamide comprising at least one repeating unit of formula I: —[OC—Ar—O—P(=O)(—Ar)—O—Ar—CO—NH—R—NH]— Formula (I) wherein, Ar is independently selected from the group consisting of aryl, arylene, heteroaryl and carbocyclic group; R represents a covalent bond or a divalent hydrocarbon-based group selected from the group consisting of saturated or unsaturated aliphatics, saturated or unsaturated cycloaliphatics, aromatics, arylaliphatics, and alkylaromatics.

15 Claims, 2 Drawing Sheets

PHOSPHORUS BASED CO-MONOMER FOR POLYAMIDES

TECHNICAL FIELD

Figure 1:
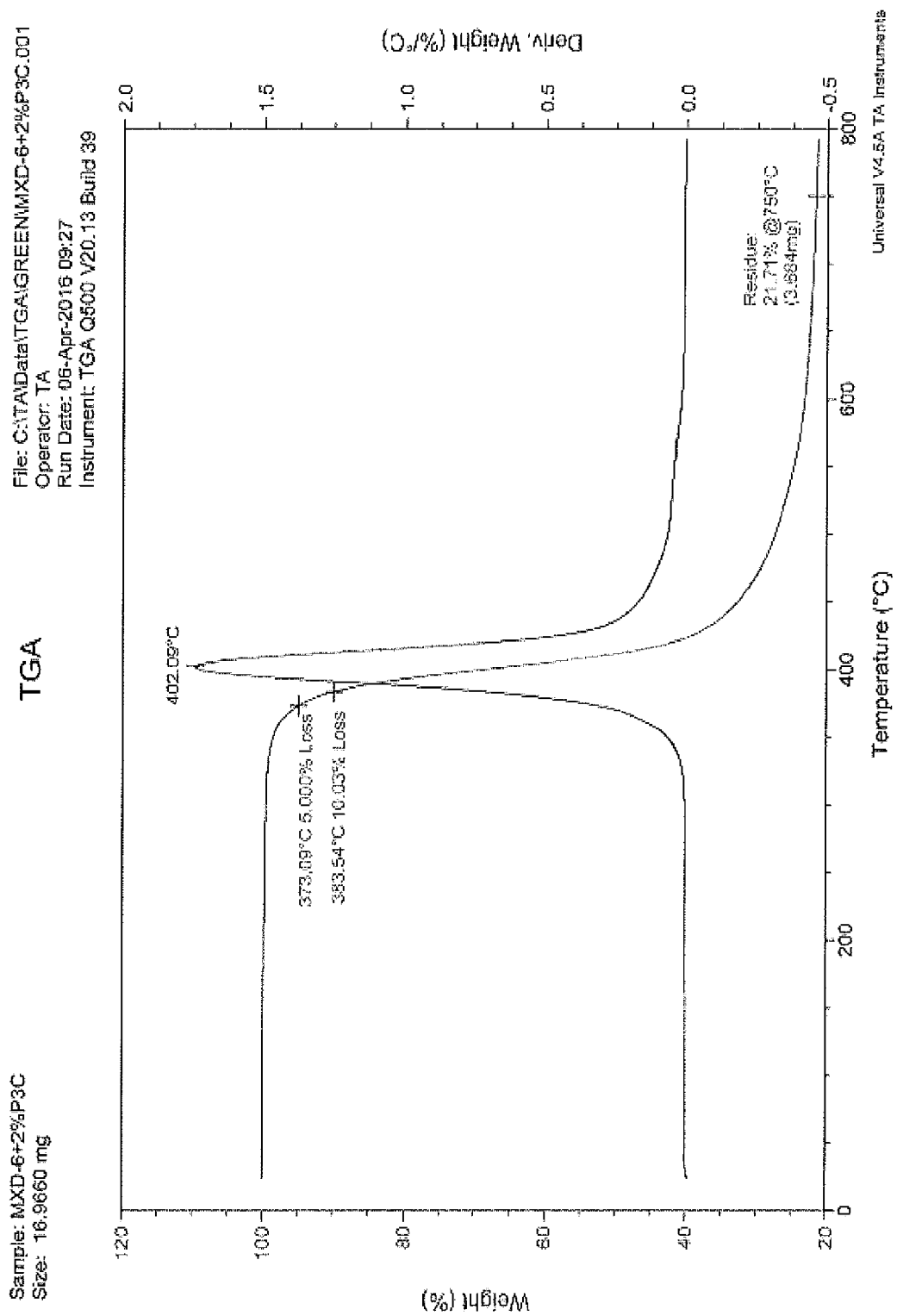

The subject matter described herein in general relates to a polyamide, an article made from the polyamide, and process for the same.

This application claims priority to Indian provisional application No. 201621035136, filed on Oct. 14, 0216, the whole content of this application being incorporated herein by reference for all purposes.

BACKGROUND

There is a great need for improvements in the thermal stability and flame retardant property of fibres or articles to be potentially used under adverse thermal conditions. One of the main approaches to improve the above properties is use of additives. However, these additives may leach out of the polymer over time and pollute the environment.

CN 103122501 describes the drawbacks of using halogen-based flame retardants. Halogen-based flame retardants cause polymer colour variation, it reduces light performance and most importantly it produces toxic gases during combustion process thereby causing atmospheric pollution.

Phosphorus compounds are widely used to reduce the flammability of thermoplastic polymers. U.S. Pat. No. 4,032,517 teaches copolyamides having 0.5 to 7.5% by weight of phosphorus as an integral part of their polymer chain. However, the used phosphorus-based reactive co-monomers are more expensive and hence unfit to be used commercially.

The most important other disadvantage of some of the phosphorus compounds is poor dye-ability due to the inert nature phosphorus additives.

Further, in prior practice, much of the work has been performed on polyester based fibers. However, U.S. Pat. No. 3,960,686 teaches that these kind of fibers face a problem of so-called pilling effect which is caused by fibres being pulled out of the fabric when the latter is worn. In turn the fabric surface obtains an unpleasant appearance, and the quality of the apparel is therefore decreased. Therefore, there is a need to provide an economical monomer which should be inexpensive with an impressive flame retardant property.

SUMMARY

The present disclosure relates to a polyamide comprising at least one repeating unit of formula I:

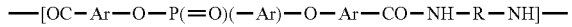

Formula (I)

—[OC—Ar—O—P(=O)(—Ar)—O—Ar—CO—NH—R—NH]— wherein, Ar is independently selected from the group consisting of aryl, arylene, heteroaryl and carbocyclic group, R represents a covalent bond or a divalent hydrocarbon-based group selected from the group consisting of saturated or unsaturated aliphatics, saturated or unsaturated cycloaliphatics, aromatics, arylaliphatics, and alkylaromatics.

These and other features, aspects and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

DETAILED DESCRIPTION

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively and any and all combinations of any or more of such steps or features.

Definitions

Should the disclosure of any patents, patent applications, and publications which are incorporated herein by reference conflict with the description of the present application to the extent that it may render a term unclear, the present description shall take precedence.

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The term "and/or" includes the meanings "and", "or" and also all the other possible combinations of the elements connected to this term.

The terms "comprise" and "comprising" are used in the inclusive, open sense, meaning that additional elements may be included. Throughout this specification, unless the context requires otherwise the word "comprise", and variations, such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "between" should be understood as being inclusive of the limits.

The term "aryl" refers to an aromatic carbocyclic group of 6 to 18 carbon atoms having a single ring (e.g. phenyl) or multiple rings (e.g. biphenyl), or multiple condensed (fused) rings (e.g. naphthyl or anthranyl). Aryl groups may also be fused or bridged with alicyclic or heterocyclic rings that are not aromatic so as to form a polycycle, such as tetralin. An "arylene" group is a divalent analog of an aryl group.

The term "aliphatics" refers to substituted or unsubstituted saturated alkyl chain having from 1 to 18 carbon atoms, substituted or unsubstituted alkenyl chain having from 1 to 18 carbon atoms, substituted or unsubstituted alkynyl chain having from 1 to 18 carbon atoms.

As used herein, "alkyl" groups include saturated hydrocarbons having one or more carbon atoms, including straight-chain alkyl groups, such as methyl, ethyl, propyl, butyl, pentyl, hexyl, heptyl, octyl, nonyl, decyl, cyclic alkyl groups (or "cycloalkyl" or "alicyclic" or "carbocyclic" groups), such as cyclopropyl, cyclopentyl, cyclohexyl, cycloheptyl, and cyclooctyl, branched-chain alkyl groups, such as isopropyl, tert-butyl, sec-butyl, and isobutyl, and alkyl-substituted alkyl groups, such as alkyl-substituted cycloalkyl groups and cycloalkyl-substituted alkyl groups. The term "aliphatic group" includes organic moieties characterized by straight or branched-chains, typically having between 1 and 18 carbon atoms. In complex structures, the chains may be branched, bridged, or cross-linked. Aliphatic groups include alkyl groups, alkenyl groups, and alkynyl groups.

As used herein, "alkenyl" or "alkenyl group" refers to an aliphatic hydrocarbon radical which can be straight or branched, containing at least one carbon-carbon double bond. Examples of alkenyl groups include, but are not limited to, ethenyl, propenyl, n-butenyl, i-butenyl, 3-methylbut-2-enyl, n-pentenyl, heptenyl, octenyl, decenyl, and the like. The term "alkynyl" refers to straight or branched chain hydrocarbon groups having at least one triple carbon to carbon bond, such as ethynyl.

The term "arylaliphatics" refers to an aryl group covalently linked to an aliphatics, where aryl and aliphatics are defined herein.

The term "cycloaliphatics" refers to carbocyclic groups of from 3 to 20 carbon atoms having a single cyclic ring or multiple condensed rings which may be partially unsaturated, where aryl and aliphatics are defined herein. The term "heterocyclic group" includes closed ring structures analogous to carbocyclic groups in which one or more of the carbon atoms in the ring is an element other than carbon, for example, nitrogen, sulfur, or oxygen. Heterocyclic groups may be saturated or unsaturated.

The term "heteroaryl" refers to an aromatic cyclic group having 3 to 10 carbon atoms and having heteroatoms selected from oxygen, nitrogen and sulfur within at least one ring (if there is more than one ring).

As used herein, the terminology "(Cn-Cm)" in reference to an organic group, wherein n and m are each integers, indicates that the group may contain from n carbon atoms to m carbon atoms per group.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 120° C. to about 150° C. should be interpreted to include not only the explicitly recited limits of about 120° C. to about 150° C., but also to include sub-ranges, such as 125° C. to 145° C., 130° C. to 150° C., and so forth, as well as individual amounts, including fractional amounts, within the specified ranges, such as 122.2° C., 140.6° C., and 141.3° C., for example.

As discussed above, in prior practice, majority of the flame retardants used are additives. Therefore, these may leach out of the polymer over time and pollute the environment. Use of the reactive co-monomers that are covalently incorporated within the polymer backbone can overcome the problem associated with leaching. Thus, the present disclosure provides a monomer which is relatively inexpensive and may be synthesized from widely available inexpensive starting materials. The monomer brings in impressive flame retardant property even when used in lower amount as compared to the quantity of additives required for the same purpose.

In one implementation, the present disclosure relates to the use of an organophosphorus compound co-monomer which is chemically incorporated in the polymer backbone in turn improving the flame retardancy of the polymers.

In one implementation, the present disclosure relates to a polyamide comprising at least one repeating unit of Formula I:

Formula (I)
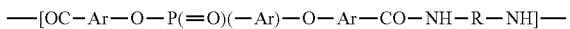
—[OC—Ar—O—P(=O)(—Ar)—O—Ar—CO—NH—R—NH]— wherein, Ar is independently selected from the group consisting of an aryl, arylene, heteroaryl and carbocyclic group, R represents a covalent bond or a divalent hydrocarbon-based group selected from the group consisting of saturated or unsaturated aliphatics, saturated or unsaturated cycloaliphatics, aromatics, arylaliphatics, alicyclics, and alkylaromatics.

Ar may notably be an aryl group or an arylene group depending on its position in the repeating unit backbone of formula (I). For instance when Ar is a radical derived from an aromatic hydrocarbon, it may be a phenyl group or a phenylene group.

In another implementation, the present disclosure relates to a polyamide comprising at least one repeating unit of Formula I:

Formula (I)
—[OC—Ar—O—P(=O)(—Ar)—O—Ar—CO—NH—R—NH]— wherein, Ar is independently selected from the group consisting of an aryl, arylene, heteroaryl and carbocyclic group, R is selected from the group consisting of hydrogenated aliphatics, cycloaliphatics, aromatics, and alicyclics.

In another implementation, R may be preferably selected from the group consisting of hydrogenated aliphatics, cycloaliphatics, aromatics, and alicyclics. R may notably be selected from the group consisting of meta-xylelenyl moiety, and para-xylelenyl moiety.

In one implementation, Ar is preferably an aryl, arylene or heteroaryl or carbocyclic group having from $C_4$ to $C_{18}$ carbon atoms. Ar is preferably a phenyl group or a phenylene group.

Repeating unit of Formula I may be for instance:

—[OC-phenylene-O—P(=O)(-phenyl)-O-phenylene-CO—NH—R—NH]— wherein R represents a covalent bond or a divalent hydrocarbon-based group selected from the group consisting of saturated or unsaturated aliphatics, saturated or unsaturated cycloaliphatics, aromatics, arylaliphatics, alicyclics, and alkylaromatics.

In another implementation, the present disclosure relates to a polyamide comprising at least one repeating unit of Formula I:

Formula (I)
—[OC—Ar—O—P(=O)(—Ar)—O—Ar—CO—NH—R—NH]— wherein, Ar is independently selected from the group consisting of an aryl, arylene, heteroaryl and carbocyclic group, R is selected from the group consisting of meta-xylelenyl moiety, and para-xylelenyl moiety.

In one implementation, the present disclosure relates to a polyamide comprising at least one repeating unit of Formula I:

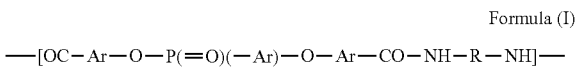
Formula (I)

wherein, Ar is an aryl or arylene, R represents a covalent bond or a divalent hydrocarbon-based group selected from the group consisting of saturated or unsaturated aliphatics, saturated or unsaturated cycloaliphatics, aromatics, arylaliphatics, alicyclics, and alkylaromatics.

In one implementation, the present disclosure relates to a polyamide comprising at least one repeating unit of Formula I:

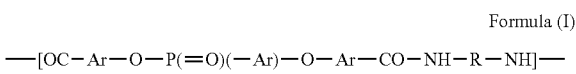
Formula (I)

wherein, Ar is heteroaryl group, R represents a covalent bond or a divalent hydrocarbon-based group selected from the group consisting of saturated or unsaturated aliphatics, saturated or unsaturated cycloaliphatics, aromatics, arylaliphatics, alicyclics, and alkylaromatics.

In one implementation, the present disclosure relates to a polyamide comprising at least one repeating unit of Formula I:

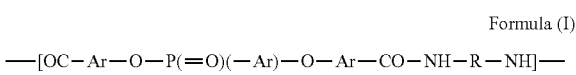
Formula (I)

wherein, Ar is carbocyclic group having from C4 to C18 carbon atoms, R represents a covalent bond or a divalent hydrocarbon-based group selected from the group consisting of saturated or unsaturated aliphatics, saturated or unsaturated cycloaliphatics, aromatics, arylaliphatics, alicyclics, and alkylaromatics.

In one implementation, the present disclosure relates to a polyamide comprising at least one repeating unit of Formula I:

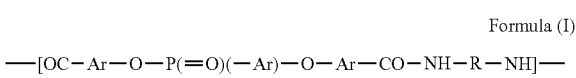
Formula (I)

wherein, Ar is phenyl group or phenylene group, R represents a covalent bond or a divalent hydrocarbon-based group selected from the group consisting of saturated or unsaturated aliphatics, saturated or unsaturated cycloaliphatics, aromatics, arylaliphatics, alicyclics, and alkylaromatics.

In one implementation, the present disclosure relates to a polyamide comprising at least one repeating unit of Formula I:

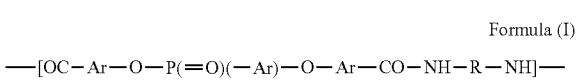
Formula (I)

wherein, Ar is an aryl or arylene, R is selected from the group consisting of hydrogenated aliphatics, cycloaliphatics, aromatics, and alicyclics.

In one implementation, the present disclosure relates to a polyamide comprising at least one repeating unit of Formula I:

Formula (I)

wherein, Ar is heteroaryl group, R is selected from the group consisting of hydrogenated aliphatics, cycloaliphatics, aromatics, and alicyclics.

In one implementation, the present disclosure relates to a polyamide comprising at least one repeating unit of Formula I:

Formula (I)

wherein, Ar is carbocyclic group having from C4 to C18 carbon atoms, R is selected from the group consisting of hydrogenated aliphatics, cycloaliphatics, aromatics, and alicyclics.

In one implementation, the present disclosure relates to a polyamide comprising at least one repeating unit of Formula I:

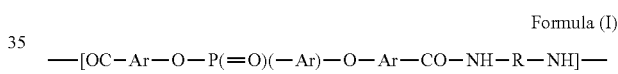
Formula (I)

wherein, Ar is phenyl group or phenylene group, R is selected from the group consisting of hydrogenated aliphatics, cycloaliphatics, aromatics, and alicyclics.

In one implementation, the present disclosure relates to a polyamide comprising at least one repeating unit of Formula I:

Formula (I)

wherein, Ar is an aryl or arylene, R is selected from the group consisting of meta-xylelenyl moiety, and para-xylelenyl moiety.

In one implementation, the present disclosure relates to a polyamide comprising at least one repeating unit of Formula I:

Formula (I)

wherein, Ar is heteroaryl group, R is selected from the group consisting of meta-xylelenyl moiety, and para-xylelenyl moiety.

In one implementation, the present disclosure relates to a polyamide comprising at least one repeating unit of Formula I:

Formula (I)

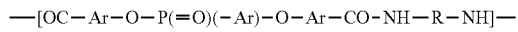

wherein, Ar is carbocyclic group having from C4 to C18 carbon atoms, R is selected from the group consisting of meta-xylelenyl moiety, and para-xylelenyl moiety.

In one implementation, the present disclosure relates to a polyamide comprising at least one repeating unit of Formula I:

Formula (I)

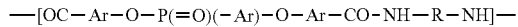

wherein, Ar is phenyl group or phenylene group, R is selected from the group consisting of meta-xylelenyl moiety, and para-xylelenyl moiety.

The polyamide of the present invention may be a homopolyamide or a copolyamide.

The polyamide of the present invention may notably be a homopolyamide and then only made of repeating units of Formula I.

The polyamide of the present invention mays also be a copolyamide then further comprising other repeating units different from the unit of formula (I), said repeating units originating from co-monomers such as dicarboxylic acids, diamines, amino acids and/or lactams.

In one implementation, the present disclosure relates to a polyamide comprising at least one repeating unit of Formula I:

Formula (I)

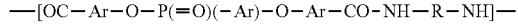

wherein, Ar is independently selected from the group consisting of an aryl, arylene, heteroaryl and carbocyclic group, R represents a covalent bond or a divalent hydrocarbon-based group selected from the group consisting of saturated or unsaturated aliphatics, saturated or unsaturated cycloaliphatics, aromatics, arylaliphatics, alicyclics, and alkylaromatics, the polyamide is a copolyamide further comprising other repeating units different from the unit of formula (I), said repeating units originating from co-monomers such as dicarboxylic acids, diamines, amino acids and/or lactams.

The present invention may notably relates to a copolyamide comprising at least one repeating unit of Formula I:

Formula (I)

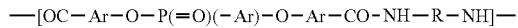

wherein, Ar is independently selected from the group consisting of an aryl, arylene, heteroaryl and carbocyclic group, R represents a covalent bond or a divalent hydrocarbon-based group selected from the group consisting of saturated or unsaturated aliphatics, saturated or unsaturated cycloaliphatics, aromatics, arylaliphatics, alicyclics, and alkylaromatics, the polyamide is a copolyamide further comprising other repeating units different from the unit of formula (I), said repeating units originating from dicarboxylic acids.

The polyamide according to the present invention may comprise from 0.1 to 100 mole % of repeating unit of Formula I, based on the total amount of residues of monomers units, preferably from 0.2 to 50 mol %, more preferably from 0.5 to 25 mol %.

Preferably the polyamide according to the present invention comprises between 0.1 and 100 mole % of bis(p-methoxycarbonyl phenyl) phosphate in diacid part, more preferably between 1 and 20 mol % of bis(p-methoxycarbonyl phenyl) phosphate in diacid part, such as between 2 and 10 mol % of bis(p-methoxycarbonyl phenyl) phosphate in diacid part. Such a mol % is based upon 100 mole % of residues of monomers units of the polyamide.

The dicarboxylic acid is preferably chosen in the group constituted by aliphatic diacids, aromatic diacids, acyclic aliphatic diacids and mixtures thereof.

The diamine may be chosen in the group constituted by aliphatic diamines, aromatic diamines, cycloaliphatic diamines, acyclic aliphatic diamines and mixtures thereof.

Copolyamides of the invention may comprise then repeat units of polyamide 6, polyamide 7, polyamide 6.6, polyamide 10, polyamide 11, polyamide 12, polyamide 6.9, polyamide 510, polyamide 610, polyamide 612, polyamide 614, polyamide 1010, polyamide 1012, polyamide 1014, polyamide 1018, polyamide 1212, polyamide 46, polyamide 618, polyamide 636, polyamide 6T, polyamide 6I, polyamide 9T, polyamide MXD6, polyamide PXD6, and copolymers based on these (co)polyamides. Polymer of the invention may preferably comprise repeat units of polyamide 6, polyamide 66, polyamide 11, polyamide 12, polyamide 66/6 and copolymers based on these (co)polyamides.

In one implementation, the present disclosure relates to a polyamide comprising at least one repeating unit of Formula I:

Formula (I)

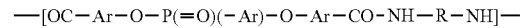

wherein, Ar is independently selected from the group consisting of an aryl, arylene, heteroaryl and carbocyclic group, R represents a covalent bond or a divalent hydrocarbon-based group selected from the group consisting of saturated or unsaturated aliphatics, saturated or unsaturated cycloaliphatics, aromatics, arylaliphatics, alicyclics, and alkylaromatics, wherein the repeating unit of formula (I) comprises between 0.1 and 100 mole % of bis(p-methoxycarbonyl phenyl) phosphate in diacid part.

In one implementation, the present disclosure relates to a polyamide comprising at least one repeating unit of Formula I:

Formula (I)

—[OC—Ar—O—P(=O)(—Ar)—O—Ar—CO—NH—R—NH]— wherein, Ar is independently selected from the group consisting of an aryl, arylene, heteroaryl and carbocyclic group, R represents a covalent bond or a divalent hydrocarbon-based group selected from the group consisting of saturated or unsaturated aliphatics, saturated or unsaturated cycloaliphatics, aromatics, arylaliphatics, alicyclics, and alkylaromatics, wherein the repeating unit of formula (I) comprises between 1 and 20 mol % of bis(p-methoxycarbonyl phenyl) phosphate in diacid part.

In one implementation, the present disclosure relates to a polyamide comprising at least one repeating unit of Formula I:

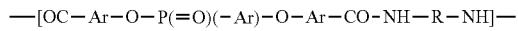
Formula (I)

—[OC—Ar—O—P(=O)(—Ar)-O—Ar—CO-NH—R—NH]— wherein, Ar is independently selected from the group consisting of an aryl, arylene, heteroaryl and carbocyclic group, R represents a covalent bond or a divalent hydrocarbon-based group selected from the group consisting of saturated or unsaturated aliphatics, saturated or unsaturated cycloaliphatics, aromatics, arylaliphatics, alicyclics, and alkylaromatics, wherein the repeating unit of formula (I) comprises between 2 and 10 mol % of bis(p-methoxycarbonyl phenyl) phosphate in diacid part.

In one implementation, the present disclosure relates to a process of preparing the polyamide comprising at least one repeating unit of Formula I:

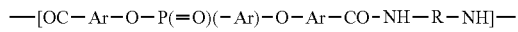
Formula (I)

—[OC—Ar—O—P(=O)(—Ar)-O—Ar—CO-NH—R—NH]— wherein, Ar is independently selected from the group consisting of an aryl, arylene, heteroaryl and carbocyclic group, R represents a covalent bond or a divalent hydrocarbon-based group selected from the group consisting of saturated or unsaturated aliphatics, saturated or unsaturated cycloaliphatics, aromatics, arylaliphatics, alicyclics, and alkylaromatics; said process comprises a polycondensation reaction between:

at least one dicarboxylic acid of Formula (II) below:

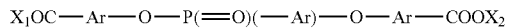
Formula (II)

X₁OC—Ar—O—P(=O)(—Ar)—O—Ar—COOX₂ wherein X₁ and X₂ are independently selected from the group consisting of hydroxyl, alkoxy and halogen group; Ar as defined above;
and
at least one diamine of Formula (III) below:

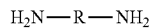
Formula (III)

H₂N—R—NH₂ with R as defined above, to obtain the polyamide.

Said process may also comprise addition of other monomers in the polycondensation reaction medium. Said monomers are preferably chosen in the group consisting of: dicarboxylic acids, diamines, amino acids and/or lactams.

The process may comprise addition from 0.1 to 60 mole % of the dicarboxylic acid of Formula (II), based on the total amount of residues of monomers units, preferably from 0.2 to 40 mol %, more preferably from 0.5 to 25 mol %.

For instance the polymer of the invention can, for example, be:

a polyamide synthesized from a dicarboxylic acid of Formula (II) in which Ar is phenyl or phenylene and a diamine of Formula (III) in which R is a xylene.

a copolyamide synthesized from a dicarboxylic acid of Formula (II) in which Ar is phenyl or phenylene and a diamine of Formula (III) in which R is a xylene, and adipic acid.

In one implementation, the present disclosure relates to a polyamide composition comprising: a polyamide comprising: at least one repeating unit of Formula I:

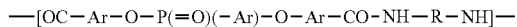
Formula (I)

—[OC—Ar—O—P(=O)(—Ar)-O—Ar—CO-NH—R—NH]— wherein, Ar is independently selected from the group consisting of an aryl, arylene, heteroaryl and carbocyclic group, R represents a covalent bond or a divalent hydrocarbon-based group selected from the group consisting of saturated or unsaturated aliphatics, saturated or unsaturated cycloaliphatics, aromatics, arylaliphatics, alicyclics, and alkylaromatics; and at least one reinforcing filler and/or at least one other additive.

In one implementation, the present disclosure relates to a process for preparing the polyamide composition by blending a polyamide comprising: at least one repeating unit of Formula I:

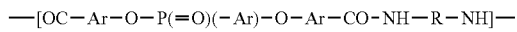
Formula (I)

—[OC—Ar—O—P(=O)(—Ar)-O—Ar—CO-NH—R—NH]— wherein, Ar is independently selected from the group consisting of an aryl, arylene, heteroaryl and carbocyclic group, R represents a covalent bond or a divalent hydrocarbon-based group selected from the group consisting of saturated or unsaturated aliphatics, saturated or unsaturated cycloaliphatics, aromatics, arylaliphatics, alicyclics, and alkylaromatics; and at least one reinforcing filler and/or at least one other additive.

The process for preparing a polyamide according to the invention also comprises a polycondensation reaction between:

at least one dicarboxylic acid of formula (II) below:

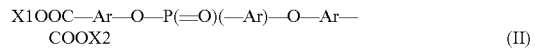

X1OOC—Ar—O—P(=O)(—Ar)—O—Ar—COOX2     (II)

wherein X1 and X2 are independently selected from hydrogen, alkyl group or halogen group; Ar as previously defined;
and
at least one diamine of formula (III) below:

H2N—R—NH2     (III)

with R as previously defined, to obtain the polyamide.

The polyamide composition may also comprise at least one other polyamide, notably one or two other polyamides.

As polyamides that may be used in the composition of the invention, mention may be made of semicrystalline or amorphous (co)polyamides, ie. polyamides or copolyamides, such as aliphatic polyamides, semiaromatic polyamides and, more generally, linear polyamides obtained by polycondensation between a saturated aliphatic or aromatic diacid and a saturated aliphatic or aromatic primary diamine, polyamides obtained by condensation of a lactam or an amino acid, or linear polyamides obtained by condensation of a mixture of these various monomers. More specifically, these copolyamides may be, for example, polyhexamethylene adipamide, polyphthalamides obtained from terephthalic and/or isophthalic acid, and copolyamides obtained from adipic acid, hexamethylenediamine and caprolactam.

Preferably the polyamide is selected from the group consisting of
the polyamides obtained by polycondensation of:
at least one aliphatic, cycloaliphatic or aromatic diacid with at least one aliphatic, cycloaliphatic or aromatic diamine,
at least one amino acid to itself, the amino acid preferably being an omega aminoacid generated by opening of a lactam ring, or
copolyamides obtained by the polycondensation of combinations of said diacid, diamine and/or aminoacid.

At least one of the diacid, diamine and/or aminoacid monomer used in the polycondensation may comprise from 2 to 40 carbon atoms.

Polyamides are preferably chosen from the group consisting of (co)polyamides as follows: polyamide 6, polyamide 7, polyamide 66, polyamide 10, polyamide 11, polyamide 12, polyamide 69, polyamide 510, polyamide 610, polyamide 612, polyamide 614, polyamide 1010, polyamide 1012, polyamide 1014, polyamide 1018, polyamide 1212, polyamide 46, polyamide 618, polyamide 636, polyamide 9T, polyamide MXD6, polyamide 66/6T, polyamide 66/MPMD.T, (MPMD=methyl-pentamethylenediamine), polyamide 66/6I and blends and copolymers based on these polyamides.

The composition of the invention may also comprise copolyamides derived especially from the above polyamides, or blends of these polyamides or copolyamides.

The preferred polyamides are polyhexamethylene adipamide, polycaprolactam, or copolymers and blends of polyhexamethylene adipamide and polycaprolactam.

Polyamides whose molecular weights are suited to injection-molding processes, for example with a viscosity index VI of between 80 and 200 ml/g, and most prefereably between 100 and 160 ml/g, according to standard ISO 307, are generally used; however, polyamides of lower viscosity may also be used.

Composition of the invention may be for instance:
a blend of a polyamide synthesized from a dicarboxylic acid of Formula (II) in which Ar is phenyl or phenylene and a diamine of Formula (III) in which R is a xylene, and a polyamide 66;
a blend of a co-polyamide synthesized from a dicarboxylic acid of Formula (II) in which Ar is phenyl or phenylene and a diamine of Formula (III) in which R is a xylene, and adipic acid, and a polyamide 66;
a blend of a polyamide synthesized from a dicarboxylic acid of Formula (II) in which Ar is phenyl or phenylene and a diamine of Formula (III) in which R is a xylene, and a polyamide 610;
a blend of a co-polyamide synthesized from a dicarboxylic acid of Formula (II) in which Ar is phenyl or phenylene and a diamine for Formula (III) in which R is a xylene, and adipic acid, and a polyamide 610.

The invention also concerns a polyamide composition comprising at least the polyamide of the invention and at least one reinforcing filler and/or at least one other additive. Reinforcing filler and/or additives may be added by blending with the polyamide. Polyamide composition is then usually extruded in the form of rods, for example in a twin-screw extrusion device, said rods then being chopped into granules.

More generally, the composition according to the invention may also comprise additives normally used for the manufacture of polymer compositions, especially intended to be molded. Thus, mention may be include plasticizers, nucleating agents, catalysts, light and/or thermal stabilizers, lubricants, antidriping agents, antioxidants, antistatic agents, colorants, pigments, matting agents, conductive agents, such as carbon black, molding additives or other conventional additives. Lubricants may be stearic acid or stearate salts such as calcium stearate. Antidriping agents may be poly (tetrafluoroethylene), notably PTFE SN3306 for example.

The composition of the invention preferably comprises reinforcing fibers such as glass fibers or carbon fibers. Notably the composition can comprise from 5 to 50% by weight of reinforcing fibers, based on the total weight of the flame retardant polymer composition.

Composition of the invention may also comprise at least one flame retardant additive.

Different types of flame retardant additives may be used according to the invention. They can provide several mechanisms of function such as endothermic degradation, thermal shielding, dilution of gas phase, dilution of combustible portion, and radical quenching.

Flame retardant additives for polymer compositions are notably described in Plastics Additives, Gachter/Müller, Hansen, 1996, page 709 and passim. Useful Flame retardant additives are notably cited in the following patents: U.S. Pat. Nos. 6,344,158, 6,365,071, 6,211,402 and 6,255,371.

Flame retardant additives used in the composition of the instant invention are preferably chosen in the group comprising:
A) Phosphorous containing flame retardant additives, such as:
phosphine oxide such as for example triphenylphosphine oxide, tri-(3-hydroxypropyl) phosphine oxide and tri-(3-hydroxy-2-methylpropyl) phosphine oxide.
phosphonic acids and their salts, and phosphinic acids and their salts, such as for example phosphinic acid of zinc, magnesium, calcium, aluminium or manganese, notably aluminium salt of diethylphosphinic acid, aluminium salt of dimethylphosphinic acid, or zinc salt of dimethylphosphinic acid.
cyclic phosphonates, such as diphosphate cyclic esters that is for example Antiblaze 1045.
organic phosphates such as triphenylphosphate.
inorganic phosphates such as ammonium polyphosphates and sodium polyphosphates.
red phosphorous, that can may be found under several shapes such as stabilized, coated, as a powder.
B) Nitrogen containing flame retardant additives, such as: triazines, cyanuric acid and/or isocyanuric acid, melamine or its derivatives such as cyanurate, oxalate, phtalate, borate, sulfate, phosphate, polyphosphate and/or pyrophosphate, condensed products of melamine such as melem, melam, melon, tris(hydroxyethyl) isocyanurate, benzoguanamine, guanidine, allantoine and glycoluril.
C) Halogen containing flame retardant additives, such as:
Bromine containing flame retardant additives, such as polybromodiphenyl oxides (PBDPO), brominated polystyrene (BrPS), poly(pentabromobenzylacrylate), brominated indane, tetradecabromodiphenoxybenzene (Saytex 120), ethane-1,2-bis(pentabromophenyl) or Saytex 8010 of Albemarle, tetrabromobisphenol A and brominated epoxy oligomers. Notably can be used the following compounds: PDB S-80 from Chemtura, Saytex HP 3010 from Albemarle or FR-803P from Dea Sea Bromine Group, FR-1210 from Dea Sea Bromine Group, octabromodiphenylether (OBPE), FR-245 from Dead Sea Bromine Group, FR-1025 from Dead Sea Bromine Group and F-2300 or F2400 from Dead Sea Bromine Group.

Chlorine containing flame retardant additives, such as Dechlorane Plus® from OxyChem (CAS 13560-89-9).

D) Inorganic flame retardant additives, such as antimony trioxide, aluminium hydroxide, magnesium hydroxide, cerium oxide, boron containing compounds such as calcium borate.

These components may be used alone or in combination. Charring agents and charring catalysts may also be used if necessary.

The composition according to the invention may comprise a flame retardant additive in an amount of 0.1 to 30 weight percent, preferably from 1 to 20 weight percent, based on the total weight of the composition.

The compositions according to the invention may be used as raw material in the field of plastics processing, for example for the preparation of articles formed by injection-molding, by injection/blow-molding, by extrusion or by extrusion/blow-molding. According to one customary embodiment, the modified polyamide is extruded in the form of rods, for example in a twin-screw extrusion device, said rods then being chopped into granules. The molded components are then prepared by melting the granules produced above and feeding the molten composition into injection-molding devices.

The present disclosure also relates to the use of the polyamide of the present invention, for making articles, notably by moulding, injection-moulding, injection/blow-moulding, extrusion/blow-moulding, extrusion or spinning.

The present disclosure relates also to the use of the polyamide composition of the invention, for making articles notably by moulding, injection-moulding, injection/blow-moulding, extrusion/blow-moulding, extrusion or spinning.

The present disclosure also relates to an article obtained from the polyamide of the invention, wherein the article is notably selected from the group consisting of from yarns, fibres, automotive parts and wire & cable parts.

The present disclosure also relates to an article obtained from the polyamide composition of the invention, wherein the article is notably selected from the group consisting of yarns, fibres, automotive parts and wire & cable parts.

EXAMPLES

The disclosure will now be illustrated with working examples, which is intended to illustrate the working of disclosure and not intended to take restrictively to imply any limitations on the scope of the present disclosure. Other examples are also possible which are within the scope of the present disclosure.

Example 1: Synthesis of Methyl-4-[(4-methoxycarbonylphenoxy)-phenylphosphoryl]oxybenzoate (P3C)

Methyl paraben (2.2 mmol) and THF (5.0 vol.) were charged in a 4-necked RBF (fitted with nitrogen inlet, reflux condenser, dropping funnel and overhead stirrer) at RT under N2, and stirred until a homogeneous solution is created. Triethyl amine (5.0 mmol) was charged to the solution at RT with continuous stirring. Phenylphosphonic dichloride (1.0 mmol) was added dropwise to the reaction mixture at RT under N2, and the resulting mixture was stirred at RT for 30 mins. Thereafter, the reaction mixture was refluxed for 2.0 hrs. White precipitate was observed in the reaction mixture. The reaction mixture was cooled to RT, and, filtered to obtain white residue. The white residue was washed with THF, and, the total filtrate (A) was kept aside. Subsequently, the obtained residue was thoroughly washed with water to remove triethylamine-HCl salt. The resulting residue was recrystallized from CHCl3:MeOH (5:1) mixture to obtain white crystalline product (>99% pure). Second crop was also collected from the mother liquor. The filtrate (A) was concentrated using rota evaporator. Residue was partitioned between water and ethyl acetate. The organic layer was separated and washed with water and brine. The ethyl acetate solution was dried over Na2SO4 and evaporated using rotary evaporator. The obtained residue was recrystallized from CHCl3:MeOH (4:1). Total yield: ~70%.

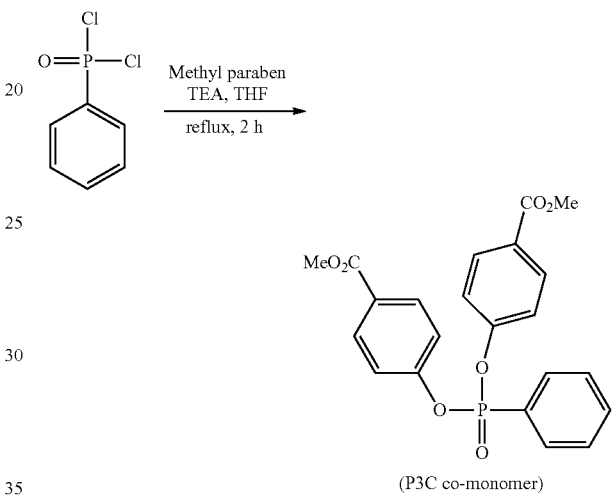

(P3C co-monomer)

Example 2: Synthesis of Polyamide MXD,6 with X % P3C co-monomer

In a hastelloy kettle having a four-necked glass lid equipped with an overhead stirrer, a nitrogen purger and a distillation condenser, was charged adipic acid, meta-xylenediamine (m-XDA) and P3C at room temperature. The kettle was heated up to 200° C. with a silicone oil bath, when water accumulation was observed in the collector flask. Thereafter, the temperature was increased at the rate of 10° C./5 min up to 265° C. Once the required temperature is attained, the formation of the polymer was monitored by observing the increment in torque value for the overhead stirrer. When the torque value reaches 30 N-m or beyond, the system is de-assembled and the polymer is quenched in ice-water mixture. The molecular weight (Mn and Mw) and polydispersity index (PDI) of the polymer are determined by GPC as provided below in Table 1. Thermal stability of the polymer is determined by DSC and TGA experiments.

TABLE 1

Table 1 depicts the GPC data (PMMA calibration) for PA MXD6 and its modified versions:

| Sample Name | Mn | Mw | PDI |
|---|---|---|---|
| MXD6 | 23336 | 56817 | 2.4348 |
| MXD6 + 5 wt % P$_3$C | 22625 | 73290 | 3.2394 |
| MXD6 + 2 wt % P$_3$C | 18833 | 41952 | 2.2275 | wt % of P$_3$C is expressed in relation to total amount of monomers used

Figure 2:
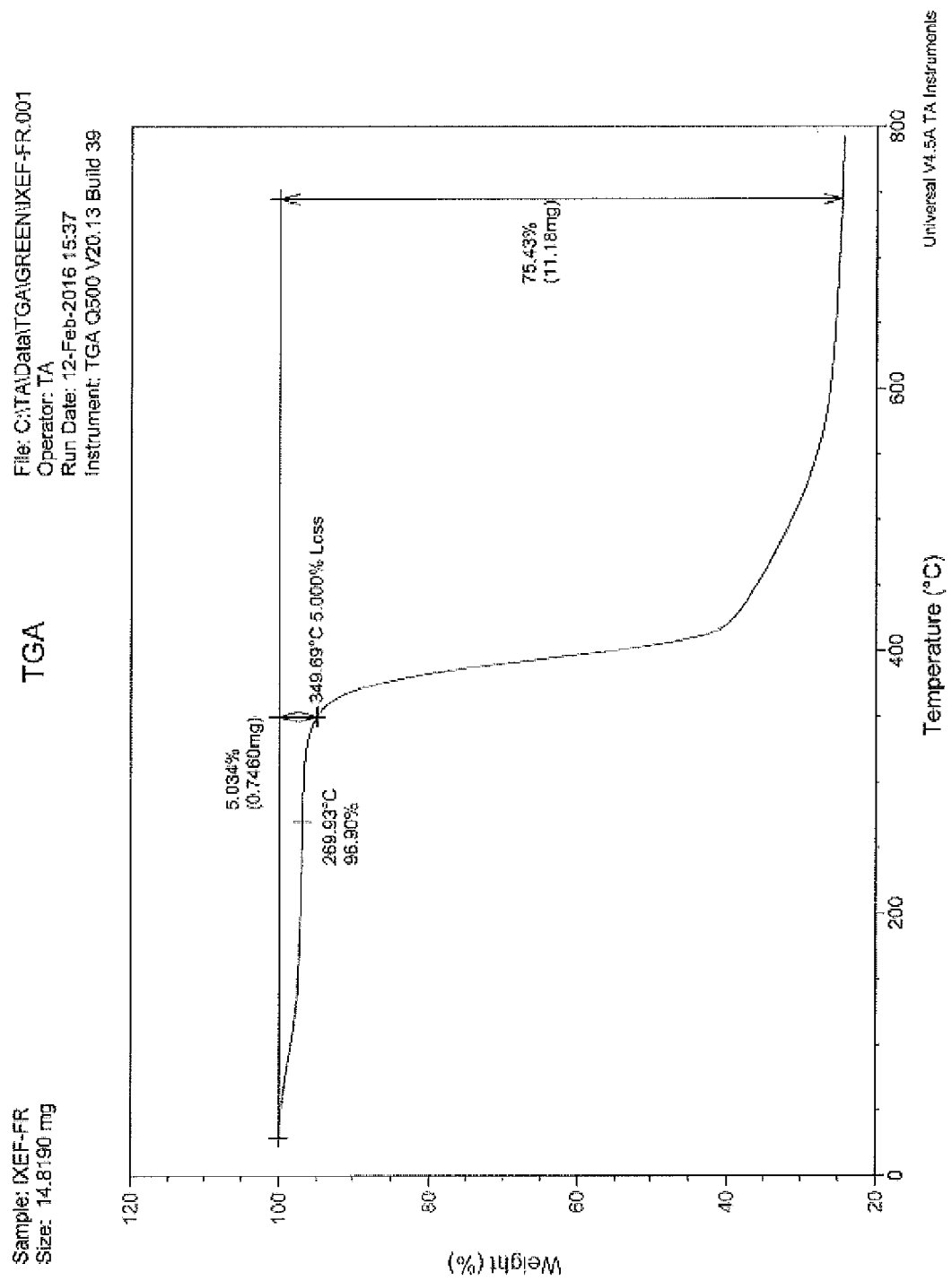

Further, the TGA data of 2 wt % P₃C incorporated MXD6 is provided in FIG. 1 and the TGA data of 5 wt % P3C incorporated MXD6 is provided in FIG. 2.

Example 3: Properties

The fact of Table 1 was supported to carry out several trials as expressed in Table 2.

TABLE 2

| Sample Name | Cone Calorimetry MAHRE (kW/m²) | Limiting Oxygen Index (%) | UL94 |
|---|---|---|---|
| MXD6 | 179 | 25 | V2 |
| MXD6 + 5 wt % P₃C | 112 | 34 | V0 |

In UL 94 V test, bars of polymer samples of average 3.2 mm thickness, were clamped vertically, and, kept in touch of a burner flame for 10 seconds. A cotton ball was kept directly below the sample to check for flammable drippings from the polymer. The burner is withdrawn after 10 seconds, and, $t_1$ denotes the time needed for the flame in the polymer to self-extinguish after the burner is removed. Then, the bar is again kept in touch of a burner flame, and, the same process is repeated. $t_2$ denotes the time needed for the flame in the polymer to self-extinguish after second application of the burner flame. $t_3$ denotes the time of glowing of the polymer bars after the flame is extinguished after the second application. In the experiments described herein, the glow time ($t_3$) in each case was 0 sec.

Therefore, the final observation resulted from the above test is that the specimen did not drip and hence the polyamide of the present disclosure is safe and economical thereby finding application as an improved flame-retardant polyamide.

Example 4: Flame Retardancy Test of Blends of P3C-Incorporated MXD6 with PA610

Blends of PA610 with P3C-incorporated (2 wt %) MXD6 in different ratios were evaluated for their flame retarding properties. All the blends contained 45% glass (FF-E glass, black colour). The composition of the blends has been summarised in the following table 3:

TABLE 3

| Composition | |
|---|---|
| PA610 | 8.25 wt % |
| MXD6 (2 wt %-P3C) | 46.75 wt % |
| Glass | 45.00 wt % |
| Properties | |
| Total Burn time (s) -using MXD6 standard | 375 |
| Total Burn time (s) -using MXD6 2% P3C | 162 |
| Total Burn time (s) -using MXD6 5% P3C | 111 |

Total burn time is measured based on UL94 vertical burn test standards. Apply a flame to a flex bar and measure how long it takes for the flame to extinguish. The longer the burn time, the lower the flame rating. The total burn time is the sum of individual burning of 5 bars.

Advantages Gained in this Subject Matter

Although the subject matter has been described in considerable detail with reference to certain examples and implementations thereof, other implementations are possible. As such, the spirit and scope of the appended claims should not be limited to the description of the preferred examples and implementations contained therein.

The present disclosure thus provides an economical and improved polyamides with flame-retardant property including a much less quantity of additives actually required for this purpose.

The invention claimed is:

1. A polyamide comprising at least one repeating unit of formula I:

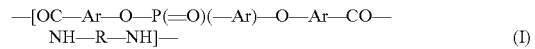

wherein

Ar is independently selected from the group consisting of aryl, arylene, heteroaryl and carbocyclic group;

R represents a covalent bond or a divalent hydrocarbon-based group selected from the group consisting of saturated or unsaturated aliphatics, saturated or unsaturated cycloaliphatics, aromatics, arylaliphatics, and alkylaromatics.

2. The polyamide according to claim 1, wherein R is selected from the group consisting of hydrogenated aliphatics, cycloaliphatics, aromatics, and alicyclics.

3. The polyamide according to claim 1, wherein R is selected from the group consisting of meta-xylelenyl moiety, and para-xylelenyl moiety.

4. The polyamide according to claim 1, wherein Ar is selected from aryl, arylene, heteroaryl and carbocyclic group having from $C_4$ to $C_{18}$ carbon atoms.

5. The polyamide according to claim 1, wherein Ar is a phenyl group or a phenylene group.

6. The polyamide according to claim 1, wherein the polyamide comprises at least one repeating unit of formula I:

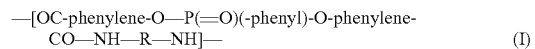

wherein

R represents a covalent bond or a divalent hydrocarbon-based group selected from the group consisting of saturated or unsaturated aliphatics, saturated or unsaturated cycloaliphatics, aromatics, arylaliphatics, and alkylaromatics.

7. The polyamide according to claim 1, wherein said polyamide is a homopolyamide only made of repeating units of formula I.

8. The polyamide according to claim 1, wherein the polyamide is a copolyamide further comprising other repeating units different from the unit of formula (I), said repeating units originating from co-monomers such as dicarboxylic acids, diamines, amino acids and/or lactams.

9. The polyamide according to claim 1, wherein said polyamide comprises from 0.1 to 100 mole % of repeating unit of Formula I, based on the total amount of residues of monomer units.

10. A process for preparing the polyamide according to claim 1, wherein the process comprises a polycondensation reaction between:

at least one dicarboxylic acid of formula (II) below:

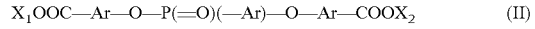

wherein $X_1$ and $X_2$ are independently selected from hydrogen, alkyl group or halogen group; Ar as defined in claim 1;

and
at least one diamine of formula (III) below:

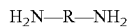

with R as defined in claim 1, to obtain the polyamide.

11. The process according to claim 10 wherein said process also comprises the addition of other monomers in the polycondensation reaction medium.

12. The process according to claim 11 wherein said monomers are chosen from the group consisting of: dicarboxylic acids, diamines, amino acids and/or lactams.

13. The process according to claim 10, wherein the process comprises the addition of 0.1 to 60 mole % of the dicarboxylic acid of Formula (II), based on the total amount of residues of monomer units.

14. The process according to claim 10, wherein the polyamide is synthesized by a polycondensation reaction between a dicarboxylic acid of Formula (II) in which Ar is phenyl or phenylene and a diamine of Formula (III) in which R is a xylene.

15. The process according to claim 10, wherein the polyamide is synthesized by a polycondensation reaction between a dicarboxylic acid of Formula (II) in which Ar is phenyl or phenylene and a diamine of Formula (III) in which R is a xylene, and adipic acid.

* * * * *